(12) United States Patent
Han

(10) Patent No.: US 7,814,079 B2
(45) Date of Patent: Oct. 12, 2010

(54) APPARATUS AND METHOD FOR MANAGING FILE

(75) Inventor: Ki-myung Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 236 days.

(21) Appl. No.: 11/709,031

(22) Filed: Feb. 22, 2007

(65) Prior Publication Data
US 2007/0276793 A1 Nov. 29, 2007

(30) Foreign Application Priority Data
Apr. 4, 2006 (KR) .................. 10-2006-0030644

(51) Int. Cl.
*G06F 7/00* (2006.01)
(52) U.S. Cl. .................. 707/698; 707/696; 707/697
(58) Field of Classification Search .................. 707/2, 707/3, 104.1
See application file for complete search history.

(56) References Cited

U.S. PATENT DOCUMENTS

| | | | |
|---|---|---|---|
| 5,890,169 A | 3/1999 | Wong et al. | |
| 6,493,709 B1 * | 12/2002 | Aiken | 707/4 |
| 6,594,665 B1 * | 7/2003 | Sowa et al. | 707/10 |
| 6,625,591 B1 * | 9/2003 | Vahalia et al. | 707/1 |
| 2005/0283489 A1 * | 12/2005 | Shiozawa et al. | 707/100 |
| 2006/0080353 A1 * | 4/2006 | Miloushev et al. | 707/102 |
| 2006/0173913 A1 * | 8/2006 | Aoyama | 707/104.1 |
| 2007/0168567 A1 * | 7/2007 | Boyd et al. | 710/5 |

FOREIGN PATENT DOCUMENTS

| | | |
|---|---|---|
| JP | 3-80367 A | 4/1991 |
| JP | 2000-305839 A | 11/2000 |
| KR | 2004-046500 A | 6/2004 |

* cited by examiner

*Primary Examiner*—Apu M Mofiz
*Assistant Examiner*—Cindy Nguyen
(74) *Attorney, Agent, or Firm*—Sughrue Mion, PLLC

(57) ABSTRACT

An apparatus and method for reducing the time required to search for files in a file system are provided. The apparatus includes a first calculating unit which calculates a first hash value of the file name of a file among a plurality of files included in a file entry, a second calculating unit which calculates a first result value based on the first hash value, a mapping-table-generating unit which generates a mapping table indicating a mapping relation between the first result value and entry numbers of the file having the first result value, and a control unit which manages a plurality of files included in the file entry based on the mapping table.

22 Claims, 10 Drawing Sheets

FIG. 3

| ENTRY NUMBER | FILE NAME | START CLUSTER |
|---|---|---|
| 1 | AAA.TXT | 2 |
| 2 | BBB.TXT | 16 |
| 3 | CCC.TXT | 21 |
| 4 | DDD.TXT | 30 |
| 5 | EEE.TXT | 35 |
| 6 | DELETED | |
| 7 | DELETED | |
| 8 | FFF.TXT | 45 |
| 9 | DELETED | |
| 10 | GGG.TXT | 72 |
| 11 | EMPTY | |

FILE ENTRY OF DIR1 (300)

APPARATUS AND METHOD FOR MANAGING FILE

CROSS-REFERENCE TO RELATED APPLICATION

This application is based on and claims priority from Korean Patent Application No. 10-2006-0030644 filed on Apr. 4, 2006, in the Korean Intellectual Property Office, the disclosure of which is incorporated herein in its entirety by reference.

BACKGROUND OF THE INVENTION

1. Field of the Invention

Methods and apparatuses consistent with the present invention relate to a file system and, more particularly, to reducing the time required to search for files in a file system.

2. Description of Related Art

Generally, an operating system (OS) uses a file system to manage the data existing on the system in which the operating system is installed. The file system is a logical structure that should be configured to manage files. For example, in the case of Microsof™ Windows™, a format command is a process of creating and initializing the file system. As such, after the file system has been created, a user can store or delete files.

Various types of file systems, such as the file allocation table (FAT) and the new technology file system (NTFS) of the Windows™ operating system, the Unix™ file system (UFS), the extended 2 (EXT2), the extended 3 (EXT3), and the journaled file system (JFS) of the Unix™/Linux™ operating systems, exist. These file systems provide various additional functions, such as data encryption and data compression.

In the related art, file systems have two storage areas. One is a data area where actual file data is stored, and the other is an information area where file information is stored. Attributes, rights, name, and position of the file are stored in the information area. A more detailed description will follow with reference to FIG. 1.

FIG. 1 is a diagram illustrating the schematic configuration of FAT file systems (such as FAT 12, FAT 16, FAT 32). As illustrated, a file system 5 includes information areas 1, 2, 3 where file information is stored, and a data area 4 where actual file data is stored.

The information areas 1, 2, 3 include a master boot record (MBR) area 1, a FAT area 2, and a directory entry area 3.

The MBR area 1 is common to all operating systems, and is generally located at the top of a physical storage medium such as a hard disk. The MBR area 1 includes information on partitions and execution codes related to booting.

The directory entry area 3 stores the position information of a first cluster where the attributes, rights, name, and position of the file are stored.

The FAT area 2 stores position information related to files. Specifically, when the actual data of the file is distributed and stored in a plurality of clusters, the FAT area 2 stores the position of the cluster where the position information of each cluster and the last data of the file are stored.

One or more files on the FAT file system are read through the following steps. First, a first cluster number of the corresponding file name is read from the directory entry area 3 through a file name and an extension. Then, the data dispersed in the data area 4 is read from position information recorded in the FAT area 2 through the first cluster number by connecting clusters where specified data is stored.

In contrast, in a process of storing files in the file system, first, information of the files to be stored is stored in the information area. At this time, the file size and first cluster number is stored in the directory entry area 3, and the position information of data is stored in the FAT area 2. Next, actual data of the file is stored in the data area 4. In file systems other than the FAT file system, files are divided and their data is stored in the information area and the data area.

As described above, when files are managed in the related art file system, the director entry area 3 must be searched first. For example, when new file is to be stored, the directory entry area 3 should be searched in order to determine whether the file name is identical to another file name, and then the file is stored depending on the result.

Additionally, as the related art file system searches for the directory entry area 3 throughout the file storage/retrieval process, the retrieval speed and file management performance may be lower.

Therefore, a technology that can improve the file retrieval speed in a file system is desired.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above. An aspect of the invention is to provide a method and apparatus for managing files in a file system.

This and other aspects and features of the present invention will become clear to those skilled in the art upon review of the following description, attached drawings and appended claims.

According to an aspect of the invention, there is provided an apparatus for managing files, the apparatus including a first calculating unit that calculates a first hash value of the file name of a file among a plurality of files included in a file entry, a second calculating unit that performs a calculation after receiving the calculated first hash value, and then calculates a first result value according to the result of the calculation, a mapping-table-generating unit that generates a mapping table indicating a mapping relation between the first result value and entry numbers of the file having the first result value, and a control unit that manages a plurality of files included in the file entry based on the mapping table.

According to another aspect of the invention, there is provided a method of managing files, the method including calculating a first hash value of the file name of a file among a plurality of files included in a file entry, performing a calculation after receiving the calculated first hash value and then calculating a first result value calculated according to the result of the calculation, generating a mapping table indicating a mapping relation between the first result value and entry numbers of the file having the first result value, and managing a plurality of files included in the file entry based on the mapping table.

BRIEF DESCRIPTION OF THE DRAWINGS

The above and other features and aspects of the present invention will become apparent by describing in detail exemplary embodiments thereof with reference to the attached drawings, in which:

FIG. 3 illustrates a directory entry applied to an exemplary embodiment of the present invention;

DETAILED DESCRIPTION OF EXEMPLARY EMBODIMENTS OF THE INVENTION

The aspects and features of the present invention and methods of accomplishing the same may be understood more readily by reference to the following detailed description of exemplary embodiments and the accompanying drawings. The aspects of the present invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will only be defined by the appended claims.

Exemplary embodiments of the invention will be described hereinafter with reference to flowchart illustrations of methods.

Figure 1:
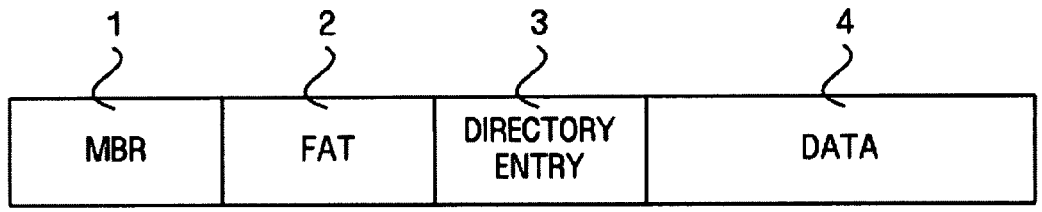
FIG. 1 is a diagram illustrating the schematic configuration of a FAT file system in the related art.
Figure 2:
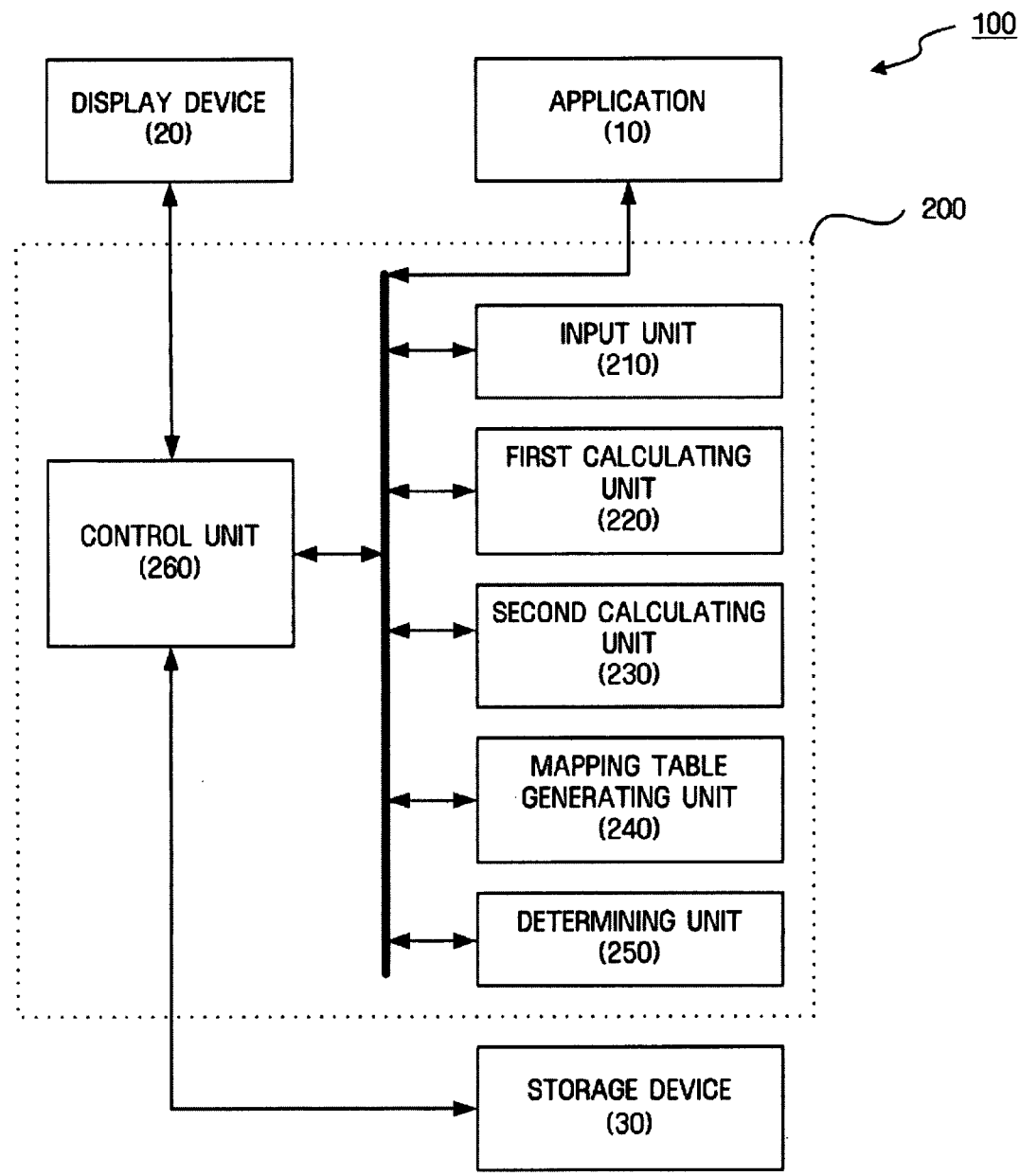
FIG. 2 is a block diagram illustrating the configuration of a file management system including a file-management apparatus according to an exemplary embodiment of the present invention.

FIG. 2 is a block diagram illustrating the configuration of a file management system 100 including a file-management apparatus according to an exemplary embodiment of the present invention.

The file management system 100 illustrated in FIG. 2 is a system which manages digital data. This file system may be implemented on a computer, a digital TV, a cellular phone, a personal digital assistant (PDA), a portable multimedia player (PMP), an MP3 player, and a USB memory stick. However, the file management system 100 is not limited thereto. Accordingly, the file management system 100 may be used with a storage device 30 in a multitude of configurations.

Specifically, in this exemplary embodiment, the file management system 100 includes a storage device 30, a display device 20, an application 10, and a file-management apparatus 200.

The storage device 30 stores the file generated by the application. Here, the file includes a unit file or a directory. The storage device 30 also stores a mapping table 400 with respect to a file. The storage device 30 may be implemented as a nonvolatile memory element, such as a flash memory, a hard disk, or an optical disk, a volatile memory element, such as a random access memory (RAM), a hard disk, an optical disk, a magnetic disk, or others.

The display device 20 indicates the result of managing the command in visible form. For example, if an access to the specified file is performed, the display device 20 displays the file and the subdirectories existing in the corresponding file.

The file-management apparatus 200, when an access to the specified file is performed from an application 10, generates the mapping table 400 with respect to the corresponding file. Then, when a new file is stored at the bottom part of the corresponding file, or, when the existing file at the bottom part of the corresponding file is deleted, the file management apparatus 200 generates or deletes files based on the mapping table 400.

The file-management apparatus 200 is a logical component, comprising an inputting unit 210, a first calculating unit 220, a second calculating unit 230, a mapping-table-generating unit 240, a determining unit 250, and a control unit 260.

The inputting unit 210 receives the command provided from the application 10. For example, the inputting unit 210 receives the commands to access the specified files or to generate a file sub-directory at the bottom part of the specified file.

When the specified file is accessed, the first calculating unit 220 generates a hash value by receiving a file name of the file in a file entry 300. Here, the file name may be a disk operating system (DOS) name including an extension. At this time, one or more files may exist at the bottom part of the file. The first calculating unit 220 hashes with respect to every file existing at the bottom part of the corresponding file. The hash value generated by the first calculating unit 220 is provided to the second calculating unit 230.

When a new file is generated, the first calculating unit 220 generates a hash value by receiving a file name of the file to be generated. Here, the validity of a file name of the file to be generated has not been verified yet, hence, the file name corresponds to a temporary file name. The verification of the validity of the temporary file name is performed by the following determining unit, and it can be set as a formal file name according to the result of the determination of the determining unit. If the validity has not been verified, other temporary file name may be set by a user.

For example, when generating the file such as "AAA.TXT", the "AAA.TXT" corresponds to a temporary file name, and the first calculating unit 220 generates a hash value of the temporary file name "AAA.TXT". The hash value generated by the first calculating unit 220 is provided to the second calculating unit 230.

The first calculating unit 220 calculates the hash values respectively with respect to file names of the file to be generated and to be deleted when a new file is generated or an existing file is deleted.

Figure 4A:
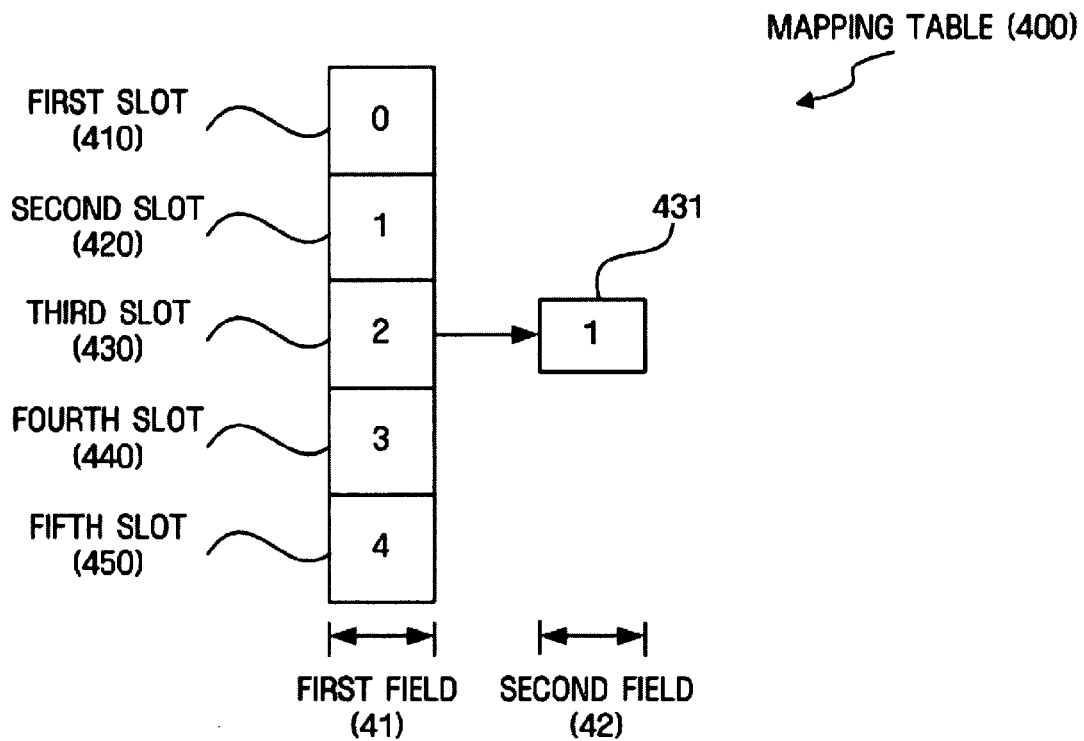
FIGS. 4A to 4C illustrate mapping table generating process according to an exemplary embodiment of the present invention.
Figure 4B:
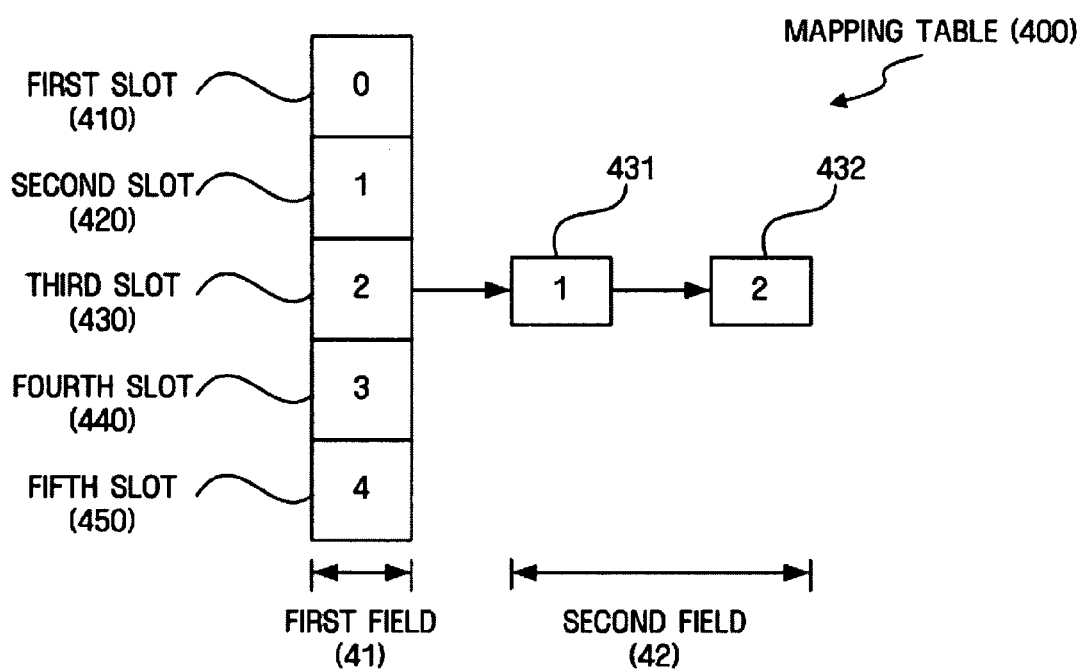
Figure 4C:
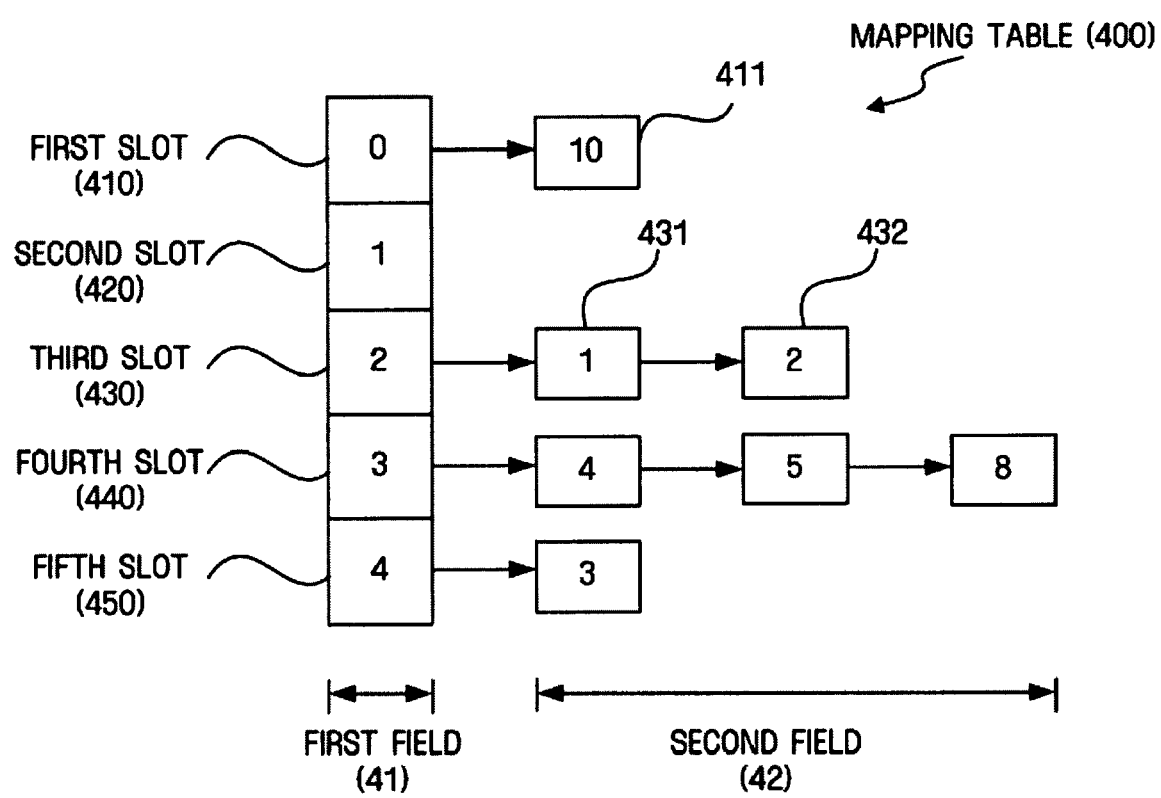

The second calculating unit 230 performs a calculation after receiving the hash value provided from the first calculating unit 220, and calculates a result value. At this time, the result value may have a predetermined range. The kinds of calculation performed by the second calculating unit 230 may vary depending on various forms of implementation, however, division will be used in this exemplary embodiment of the present invention hereinafter. When the second calculating unit 230 performs division, the remainder obtained by dividing the hash value calculated by the first calculating unit 220 into a divisor is determined as a result value of the second calculating unit 230. At this time, the divisor is determined based on the number of the slots of the following mapping table 400, as illustrated in FIGS. 4A-4C. The number and range of the result value also can be determined based on the number of the slots. The result value calculated by the second calculating unit 230 is provided to the mapping-table-generating unit 240.

When a new file is generated or an existing file is deleted, the second calculating unit 230 receives the hash value of a file name of the corresponding file from the first calculating unit 220. Then, it performs a calculation setting the provided hash value as an input value in order to calculate the result value.

The mapping-table-generating unit 240 generates the mapping table 400 of the corresponding file when an access to the specified file is requested from the application 10. The mapping-table-generating unit 240 renews the mapping table 400 when a new file is generated at the bottom part of the corresponding file or the existing file is deleted.

The mapping table 400 generated by the mapping-table-generating unit 240, as illustrated in FIGS. 4A-4C, includes a first field 41 and a second field 42. At this time, the first field 41 indicates a result value calculated by the second calculating unit 230, and the second field 42 indicates an entry number of files having the result value identical to a certain result value calculated by the second calculating unit 230.

Meanwhile, the first field 41 may include a number of slots identical to the number of the result values calculated by the second calculating unit 230. The result value calculated by the second calculating unit 230 may correspond to the respective slots. The second value 42 includes one or more nodes linked to the respective slots of the first field 41, the respective slots have an entry number the number of files having the result value identical to a certain result value of the first field 41.

If the kind of the calculation performed by the second calculating unit 230 is division, the divisor and the range of the result value are determined depending on the number of the slots of the first field 41. For example, if the number of slots is n (where n is an integer), the divisor is n. Also, the result value is the remainder calculated after the hash value provided by the first calculating unit 220 is divided into n, hence, having the range of 0-n-1.

Meanwhile, the result value calculated by the second calculating unit 230 corresponds to the respective slots of the mapping table 400. When the file having a temporary file name is to be generated in the file entry 300 related to the mapping table 400, the result value can be used as an index for searching the file name identical to the temporary file name in the file entry 300. The result value can also be used as an index for searching the file name identical to the file name to be deleted in the corresponding file entry 300 when a file is to be deleted in the corresponding file entry 300.

A more detailed description on the mapping table 400 will follow with reference to FIGS. 3 to 4C. Here, FIG. 3 illustrates a file entry 300 of the file having the name called "DIR1", and FIGS. 4A to 4C illustrate the mapping table 400 generating process of the DIR1 file illustrated in FIG. 3.

The mapping table 400 is generated when the DIR1 file is first accessed thereto from the application 10. The mapping table 400 is generated through the following process.

When the first access to the DIR1 file is performed, the mapping-table-generating unit 240 generates the mapping table 400 wherein the first field 41 includes a number of slots. FIG. 4A illustrates the mapping table 400 wherein the first field 41 includes 5 slots. In this case, the divisor used in the second calculating unit 230 is 5. The result value has the remainder obtained by dividing the hash value provided by the first calculating unit 220 into 5 (that is, the range of 0-4), therefore, numbers 0-4 respectively correspond to the respective slots.

Then, the first calculating unit 220 outputs the respective hash values with respect to the file name of the files in the file entry 300. With respect to the file entry 300 illustrated in FIG. 3, it can be recognized that the files having file names: "AAA.TXT", "BBB.TXT", "CCC.TXT", "DDD.TXT", "EEE.TXT", "FFF.TXT", "GGG.TXT" are at the bottom part of the DIR1 file. In this case, the first calculating unit 220 generates the hash value of the file name "AAA.TXT". At this time, the generated hash value is provided to the second calculating unit 230.

When the hash value is provided from the first calculating unit 220, the second calculating unit 230 calculates the remainder obtained by dividing the provided hash value into 5, and then provides the remainder to the mapping-table-generating unit 240. For example, if the remainder obtained by dividing the hash value of the file name "AAA.TXT" into 5 is 2, the second calculating unit 230 provides the remainder 2 to the mapping-table-generating unit 240.

When the result value calculated by the second calculating unit 230 is provided, the mapping-table-generating unit 240 searches for the slot corresponding to the provided result value in the first field 41. Then, the mapping-table-generating unit 240 generates the node having an entry number of the corresponding file name, and links it to the searched slot. For example, if the result value calculated by the second calculating unit 230 is 2, the mapping-table-generating unit 240 searches for the slot corresponding to the result value 2 (that is, a third slot 430) in the mapping table 400. Then, the mapping-table-generating unit 240 generates the first node 431 having an entry number (that is, 1) of the file name "AAA.TXT", and links it to the third slot 430. As a result, the mapping table 400, like FIG. 4A, is generated.

Next, the first calculating unit 220 generates the hash value of the file name "BBB.TXT". The generated hash value is provided to the second calculating unit 230.

When the hash value is provided from the first calculating unit 220, the second calculating unit 230 calculates the remainder obtained by dividing the provided hash value into 5, and then provides it to the mapping-table-generating unit 240. For example, if the remainder obtained by dividing the hash value of the file name "BBB.TXT" into 5 is 2, the second calculating unit 230 provides the remainder 2 to the mapping-table-generating unit 240.

When the result value calculated by the second calculating unit 230 is provided, the mapping-table-generating unit 240 searches for the slot corresponding to the result value 2 (that is, the third slot 430) in the first field 41. Then, the mapping-table-generating unit 240 generates the node having an entry number of the corresponding file name, and links it to the searched slot. That is, the mapping-table-generating unit 240 generates the second node 432 having the entry number (that is, 2) of the file name "BBB.TXT", and links it to the third slot 430. At this time, since the first node 431 has already been linked to the third slot 430, the second node 432 can be linked to the first node 431. As a result, the mapping table 400 as illustrated in FIG. 4B, is generated.

The first calculating unit 220, second calculating unit 230, and mapping-table-generating unit 240 repeat the above-mentioned process with respect to every file name of the file entry 300. That is, when the above-mentioned process with respect to the last file name ".TXT" is completed in the file entry 300 of the DIR1 file, the mapping table 400 as illustrated in FIG. 4C is generated.

With reference to FIG. 2, when a new file is stored at the bottom part of the file wherein the mapping table 400 has been generated, the determining unit 250 determines whether the temporary file name of the file to be stored is valid or not. That is, the determining unit 250 determines if the temporary file name already exists in the file entry 300 of the corresponding file. If the temporary file name does not exist in the file entry 300 of the corresponding file, the temporary file name is valid. Therefore, the temporary file may be used as a formal file name. On the contrary, if the temporary file name already exists, the temporary file name is not valid. Therefore, the file having the temporary file name cannot be generated in the corresponding file entry 300. In this case, the user can set another temporary file name. The determining unit 250 can determine the validity of the temporary file name based on the hash value of the temporary file name and the mapping table 400 with respect to the corresponding file.

For a more detailed description, the case where the file "HHH.TXT" is stored in the above-mentioned DIR1 file, will be used as an example. Here, "HHH.TXT" corresponds to the temporary file name.

First, the first calculating unit 220 receives the temporary file name "HHH.TXT" and calculates the hash value of the temporary file name. The hash value calculated by the first calculating unit 220 is provided to the second calculating unit 230.

The second calculating unit 230 receives the hash value calculated by the first calculating unit 220, performs the division, and calculates the result value with respect to the division. That is, the second calculating unit 230 calculates the remainder obtained by dividing the hash value calculated by the first calculating unit 220 into 5, the number of slots in this exemplary embodiment. The result value calculated by the second calculating unit 230 is provided to the determining unit 250.

The determining unit 250 searches for the slot corresponding to the result value calculated by the second calculating unit 230 in the mapping table 400. For example, when the result value calculated by the second calculating unit 230 is 2, the determining unit 250 searches for the slot corresponding to the result value 2 (that is, the third slot 430) in the mapping table 400 of FIG. 3.

Next, the determining unit 250 refers to entry numbers of the nodes linked to the third slot 430, and searches for the file entry 300 of the DIR1 file. Then, it compares the file name corresponding to the searched file entry 300 number and the temporary file name. For example, the determining unit 250 searches for the file entry 300 of the DIR1 file with reference to the entry number (that is, 1) that the first node has among the nodes linked to the third slot 430. Then, the determining unit 250 compares the searched file name (that is, file name "AAA.TXT" located at the entry number 1) and the temporary file name "HHH.TXT".

If both files are identical, the determining unit 250 determines that the temporary file name is not valid. In this case, the message informing the invalidity of the temporary file name can be displayed by the display device 20. For example, the message informing to set a different temporary file name may be displayed by the display device 20.

If both files are not identical, the determining unit 250 determines if the first is the last node linked to the third slot 430.

If the first node is not the last node linked to the third slot 430, the determining unit 250 refers to the file entry 300 number indicated by the second node next to the first node among the nodes linked to the third slot 430, and searches for the file entry 300. Next, the determining unit 250 compares the file name "BBB.TXT" located in the entry number 2 and the temporary file name "HHH.TXT", in order to determine if they are identical. Such a comparison is performed with respect to every node linked to the third slot 430.

If the first node is the last node linked to the third slot 430, the determining unit 250 determines that file having the temporary file name "HHH.TXT" does not exist in the file entry 300 of the DIR1 file. In this case, the file having the temporary file name as a formal name can be generated in the DIR1 file.

The control unit 260 connects the respective components in the file-management apparatus 200, and manages them. When the mapping table 400 is re-accessed to the generated file, the control unit 260 generates a list of files existing at the bottom part of the corresponding file. The list of files generated by the control unit 260 is displayed by the display device 20. Based on the mapping table of a file, the control unit 260 manages the corresponding files.

Meanwhile, the term "unit", used in FIG. 2, means, but is not limited to, a software or hardware component, such as a Field Programmable Gate Array (FPGA) or an Application Specific Integrated Circuit (ASIC), which performs certain tasks. A "unit" may advantageously be configured to reside in the addressable storage medium, and to execute on one or more processors. Thus, a "unit" may include, by way of example, components, such as software components, object-oriented software components, class components and task components, process, functions, attributes, procedures, subroutines, segments of program code, drivers, firmware, microcode, circuitry, data, databases, data structures, tables, arrays, and variables. The functionality provided for in the components and "unit" may be combined into fewer components and "unit" or further separated into additional components and modules.

A file management method according to an exemplary embodiment of the present invention will be described below in detail with reference to FIG. 5.

Figure 5:
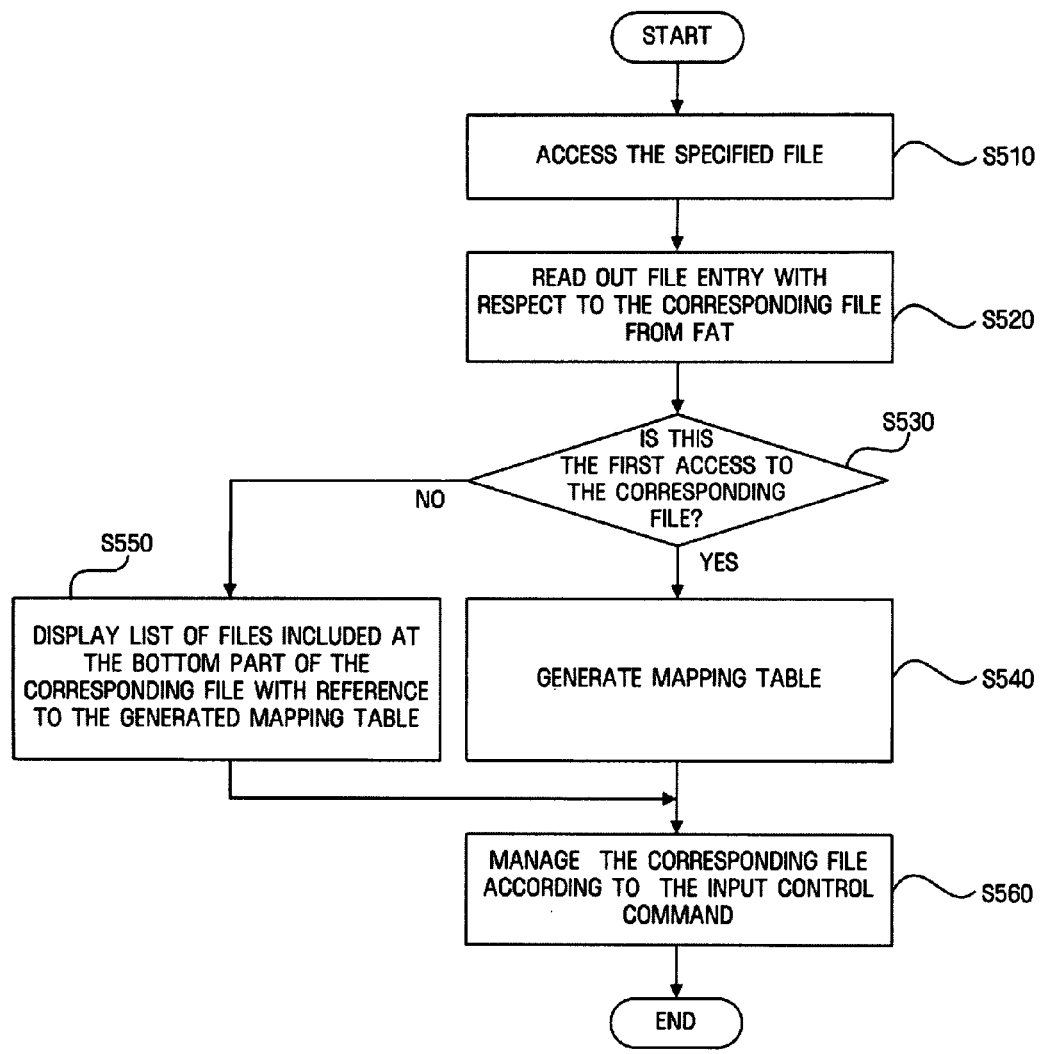
FIG. 5 is a flow chart illustrating how to manage files according to an exemplary embodiment of the present invention.

FIG. 5 is a flowchart illustrating the file management method according to an exemplary embodiment of the present invention.

First, when the specified file is accessed in operation S510, the file-management apparatus 200 reads out the file entry 300 with respect to the corresponding file from the FAT in operation S520. For example, when an access to the DIR1 file is performed, the file-management apparatus 200 reads out the file entry 300 with respect to the DIR1 file from the FAT.

Next, the file-management apparatus 200 determines if the access to the DIR1 file is a first access (S530).

If the access to the DIR1 file is determined to be a first access (YES in operation S530), the file-management apparatus 200 generates the mapping table 400 with respect to the DIR1 file (S540). The detailed description of generating the mapping table 400 will follow with reference to FIG. 6.

If an access to the DIR1 is not determined to be a first access (NO in operation S530), the file-management apparatus 200 refers to the mapping table 400 with respect to the DIR1 file so that the list of files existing at the bottom part of the DIR1 file can be displayed by the display device 20 in operation S550. The detailed description of displaying the list of files of the DIR1 file will follow with reference to FIG. 9.

Then, the file-management apparatus 200 performs the management with respect to the DIR1 file according to the control command input by the input unit 210 (S560). For example, the file-management apparatus 200 generates a new file at the bottom part of the DIR1 file, or deletes the existing file. The detailed description of generating a new file at the bottom part of the DIR1 file or deleting the existing file located at the bottom part of the DIR1 file will follow with reference to FIGS. 7 and 8.

Figure 6:
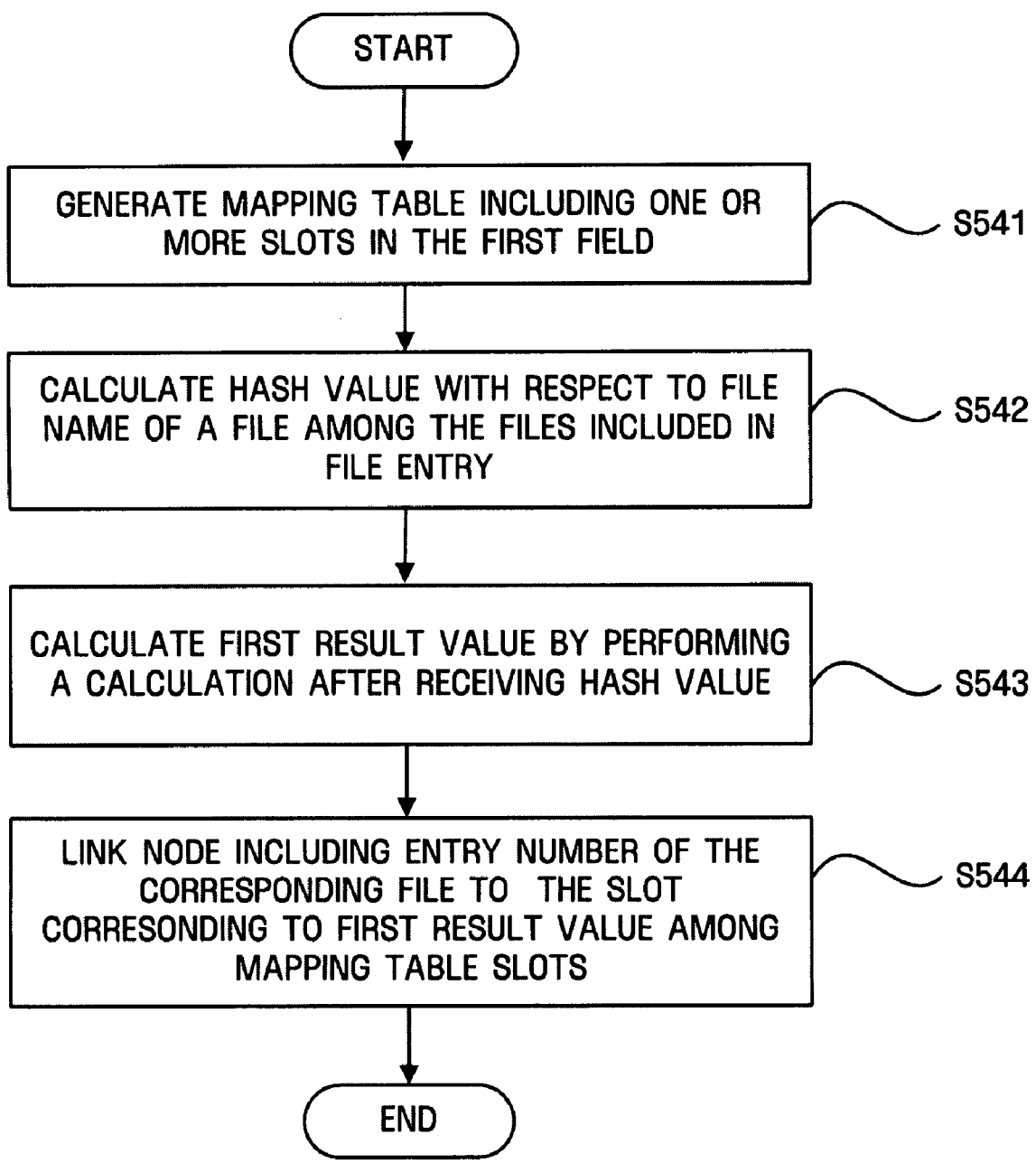
FIG. 6 is a flow chart illustrating more specifically operation S540 of generating a mapping table in FIG. 5.

FIG. 6 is a flow chart illustrating operation S540 of generating the mapping table 400 in FIG. 5.

When the DIR1 file is accessed from the application, the mapping-table-generating unit 240 generates a mapping table 400 including at least one or more slots in the first field 41 (S541). Here, the number of slots may be set in advance, and the case where the number of the slots is 5 will be used as an example in the following description.

When the mapping table 400 including 5 slots is generated in the first field 41, the divisor required to perform the division calculation in the second calculating unit 230 and the number of the result value calculated by the first calculating 230 are 5 respectively, and the result value calculated by the second calculating unit 230 has the range of 0-4. Therefore, the first slot 410, the second slot 420, the third slot 430, the fourth slot 440, and the fifth slot 450 respectively correspond to the result values 0-4.

Next, the first calculating unit 220 calculates the hash value of the file name in the file entry 300 of the DIR1 file one by one. Specifically, with reference to the file entry 300 of the DIR1 file is as illustrated in the FIG. 3, the first calculating unit 220 first calculates the hash value of the file name "AAA.TXT" (S542). Here, the hash value calculated by the first calculating unit 220 is provided to the second calculating unit 230.

The second calculating unit 230 divides the hash value calculated by the first calculating unit 220 into 5, and provides the remainder, as the result value, to the mapping-table-generating unit 240 (S543).

Meanwhile, the mapping-table-generating unit 240 searches for the slot corresponding to the result value calculated by the second calculating unit 230 in the mapping table 400 generated in the operation S541. For example, if the result value calculated by the second calculating unit 230 is 2, the mapping-table-generating unit 240 searches for the slot corresponding to the result value 2 (for example, the third slot 430).

Next, the mapping-table-generating unit 240 generates the first node having the entry number of file name "AAA.TXT", and links it to the third slot 430 in operation S544 so that the mapping table 400 as illustrated in FIG. 4A can be generated.

When the first node is linked to the third slot, the first calculating unit 220 calculates the hash value of the file name "BBB.TXT" in the file entry 300 of the DIR1 file (S542). Here, the hash value calculated by the first calculating unit 220 is provided to the second calculating unit 230.

The second calculating unit 230 provides the remainder obtained by dividing the hash value calculated by the first calculating unit 220 into 5 to the mapping-table-generating unit 240 (S543).

Meanwhile, the mapping-table-generating unit 240 searches for the slot corresponding to the result value calculated by the second calculating unit 230 in the mapping table 400 generated in operation S544. For example, if the result value calculated by the second calculating unit 230 is 2, the mapping-table-generating unit 240 searches for the slot corresponding to the result value 2 (for example, the third slot 430).

Next, the mapping-table-generating unit 240 generates the second node having the entry number of file name "AAA.TXT", and links it to the third slot 430 (S544). At this time, since the first node is linked to the third slot 430, the second node can be linked to the first node. Through this process, the mapping table 400 can be generated as illustrated in FIG. 4B.

The above-mentioned operations S542 through S544 are repeatedly performed until an empty entry is found in the file entry 300 with respect to the DIR1 file. In the case of FIG. 3, when the operations S542 through 544 with respect to the file name "GGG.TXT" are performed, the mapping table 400 is generated as illustrated in FIG. 4C.

Figure 7:
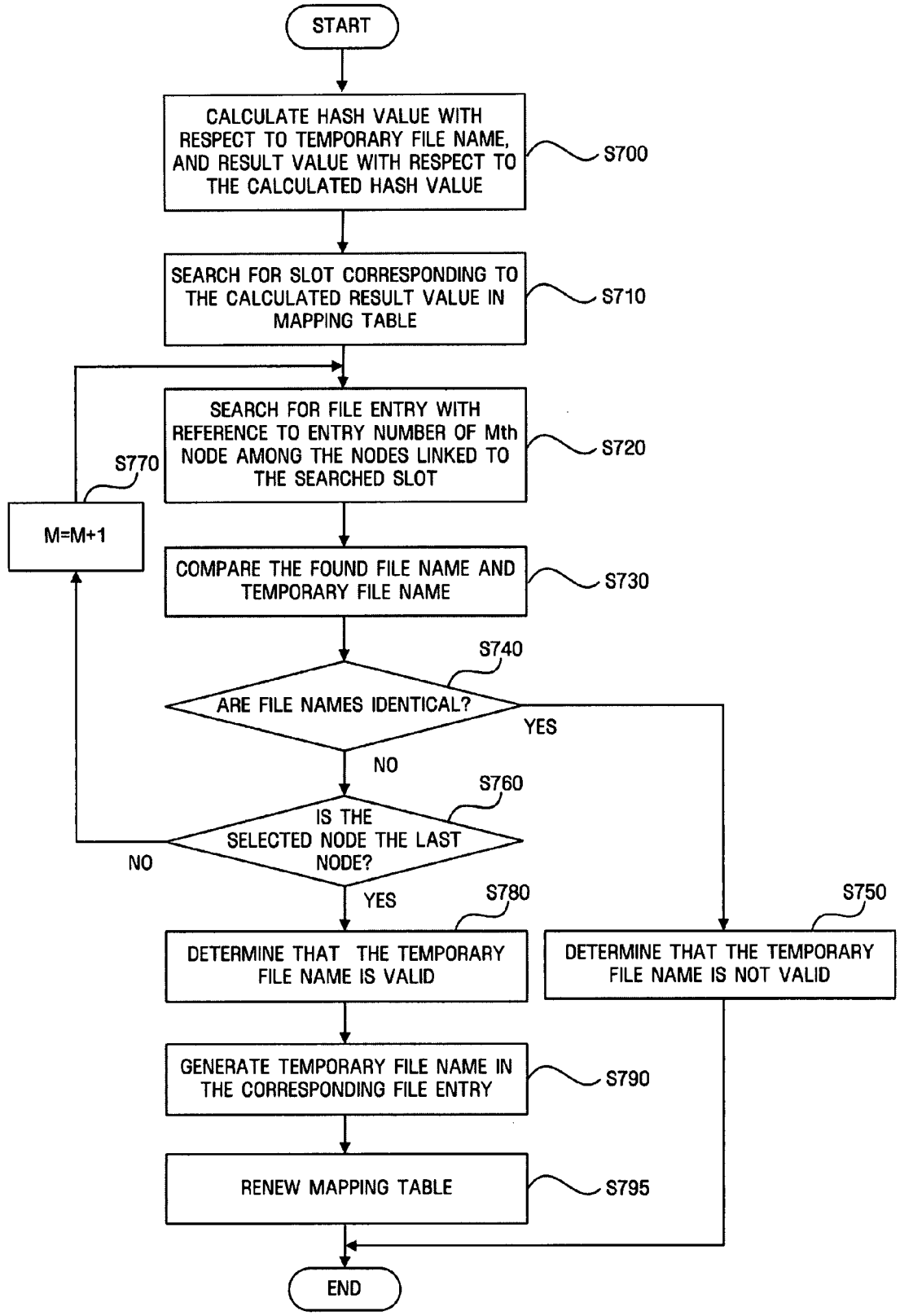
FIG. 7 is a flow chart specifically illustrating operation S560 depicted in FIG. 5 when a new file is stored in a directory.

FIG. 7 is a flowchart specifically illustrating operation S560 of FIG. 5 and the process of generating a new file in the DIR1 file.

For explanatory convenience, the case where the file with the name called "HHH.TXT" is stored at the bottom part of the DIR1 file will be described. At this time, the "HHH.TXT" corresponds to the temporary file name.

First, the first calculating unit 220 calculates the hash value of the temporary file name "HHH.TXT". Next, the second calculating unit 230 divides the hash value calculated by the first calculating unit 220 into 5, and provides the remainder to the determining unit 250 (S700).

When the result value calculated by the second calculating unit 230 is provided, the determining unit 250 determines whether the temporary file name is valid, based on the provided result value and the mapping table 400 of the DIR1 file. In other words, the determining unit 250 determines if the temporary file name has already existed at the bottom part of the DIR1 file.

Specifically, the determining unit 250 searches for the slot corresponding to the result value calculated by the second calculating unit 230 in the mapping table 400 with respect to the DIR1 file (S710). For example, if the result value calculated by the second calculating unit 230 is 2, the determining unit 250 searches for the slot corresponding to the remainder 2 (for example, the third slot 430) in the mapping table 400.

Next, the determining unit 250 refers to the entry number that the nodes linked to the third slot 430 have in the file entry 300 of the DIR1 file, searches for the file entry 300, and compares the file name stored in the searched position and the temporary file name one by one.

Specifically, the determining unit 250 refers to the entry number of the first node located at the top among the nodes linked to the searched slot, and searches for the file entry 300 (S720).

Then, the determining unit 250 compares the file name searched in the file entry 300, and the temporary file name. That is, the determining unit 250 compares the searched file name "AAA.TXT", and the temporary file name "HHH.TXT" S730.

If both file names are not identical (NO in operation S740), the determining unit 250 determines if the first node is the last node among the nodes linked to the third slot 430 (S760).

If the first node is not the last node linked to the third node 430 (NO in operation S760), the determining unit 250 searches for the file entry 300 with reference to the entry number of the second node (S770) among the nodes linked to the third slot 430 of the mapping table 400 (S720).

Next, the determining unit 250 compares the file name newly searched in the file entry 300, and the temporary file name. That is, the determining unit 250 compares the searched file name "BBB.TXT", and the temporary file name "HHH.TXT" (S730).

If both file names are not identical (NO in operation S740), the determining unit 250 determines if the second node is the last node among the nodes linked to the third slot 430 (S760).

If the second node is the last node linked to the third slot 430 (YES in operation S760), the determining unit 250 determines that the file name identical to the temporary file name "HHH.TXT" does not exist at the bottom part of the DIR1 file (S780). That is, the temporary file name "HHH.TXT" is regarded to be valid. In such a case, a file having the temporary file name "HHH.TXT" as a formal file name can be generated in the DIR1 file (S790).

If both file names are identical (YES in operation S740), the determining unit 250 regards the corresponding temporary file name to be invalid (S750). In such a case, a message informing that the corresponding temporary file name is not valid can be displayed by the display device 20. For example, the message "An identical file name exists within the directory. Please choose another file name" can be displayed via the display device 20. Therefore, other file names may be set by a user.

When a new temporary file name is set by a user, the file-management apparatus 200 determines if the newly set temporary file name is valid by repeating the above-mentioned operations S700 through S790.

According to the above-mentioned file management method, when a new file is generated in the specified directory, the time required for generation may be reduced.

Figure 8:
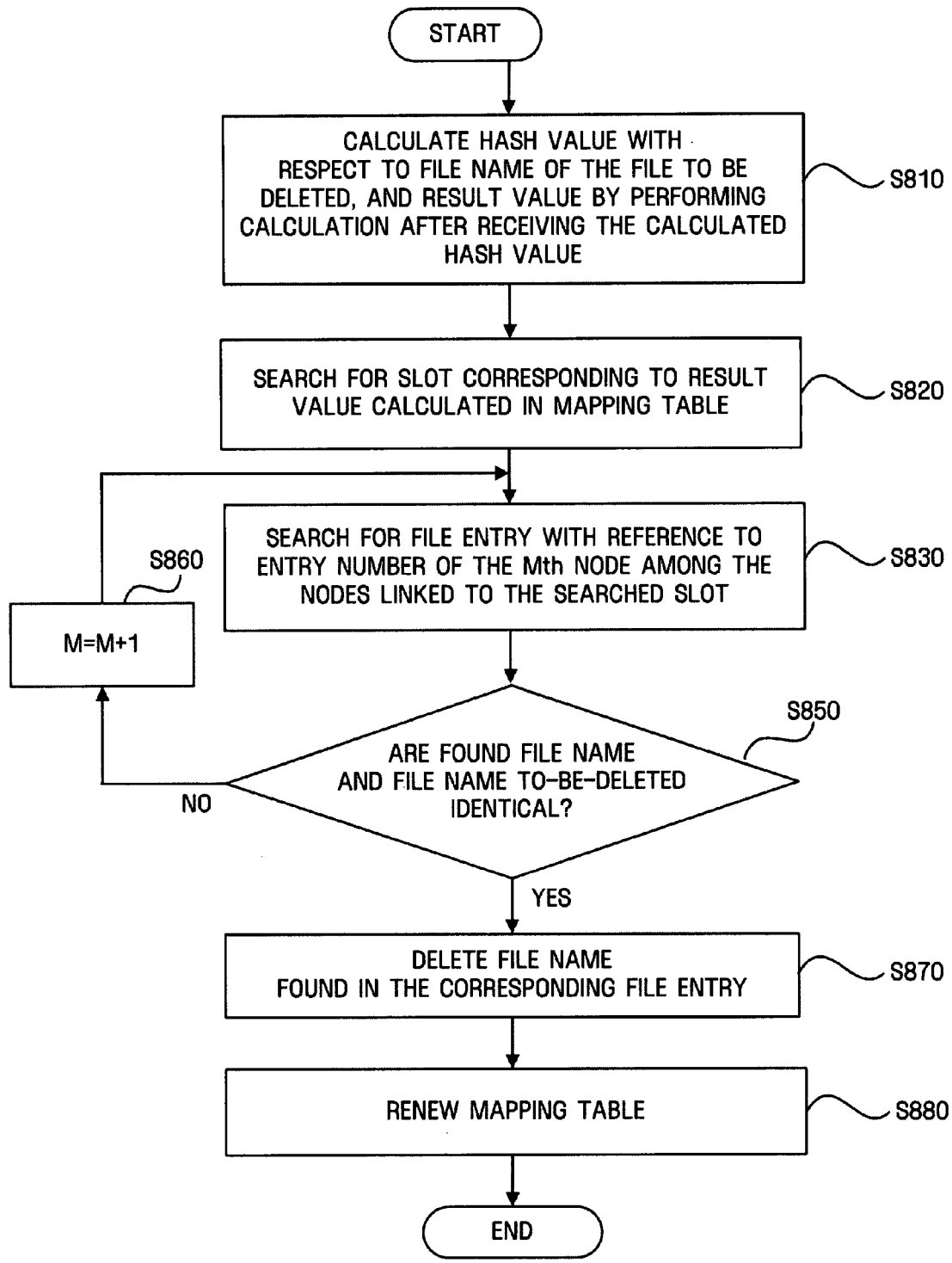
FIG. 8 is a flow chart specifically illustrating operation S560 depicted in FIG. 5, which is the deletion of a specified file from the directory.

FIG. 8 is a flowchart specifically illustrating operation S560 of FIG. 5, and the process of deleting a file in the DIR1 file.

For explanatory convenience, the case where the file having the file name "GGG.TXT", located at the bottom part of the DIR1 file, is deleted will be described. Here, the "GGG.TXT" corresponds to the formal file name.

First, the first calculating unit 220 calculates the hash value of the file name "HHH.TXT" to be deleted. Next, the second calculating unit 230 divides the hash value calculated by the first calculating unit 220 into 5, and provides the remainder to the determining unit 250 (S810).

Next, the determining unit 250 searches for the slot corresponding to the result value calculated by the second calculating unit 230 in the mapping table 400 of the DIR1 file (S820). For example, if the result value calculated by the second calculating unit 230 is 0, the determining unit 250 searches for the slot corresponding to the result value 0 (for example, the first slot 410) in the mapping table 400.

Next, the determining unit 250 refers to an entry number of the first node 411 located at the top of the nodes linked to the first slot 410, and searches for the file entry 300 (S830).

Next, the determining unit 250 compares the file name searched at the directory entry and the file name to be deleted (S850). That is, the determining unit 250 compares the file name "GGG.TXT" which has been searched, and the file name "GGG.TXT" to be deleted.

If the file names are identical (YES in operation S850), the file-management apparatus 200 deletes the searched-for file name in the file entry 300 (S870). As the searched file name is deleted, the mapping-table-generating unit 240 renews the mapping table 400 (S880). That is, the mapping-table-generating unit 240 deletes the first node 411, which has been linked to the first slot 410 in the mapping table 400 of FIG. 4C.

If the file names are not identical ("NO" in operation S850), the determining unit 250 refers to the entry number of the second-located node among the nodes linked to the first slot 410, and searches for the file entry 300 in operations S860 and S830. Then, the above-mentioned operations S830 through S880 are performed.

Figure 9:
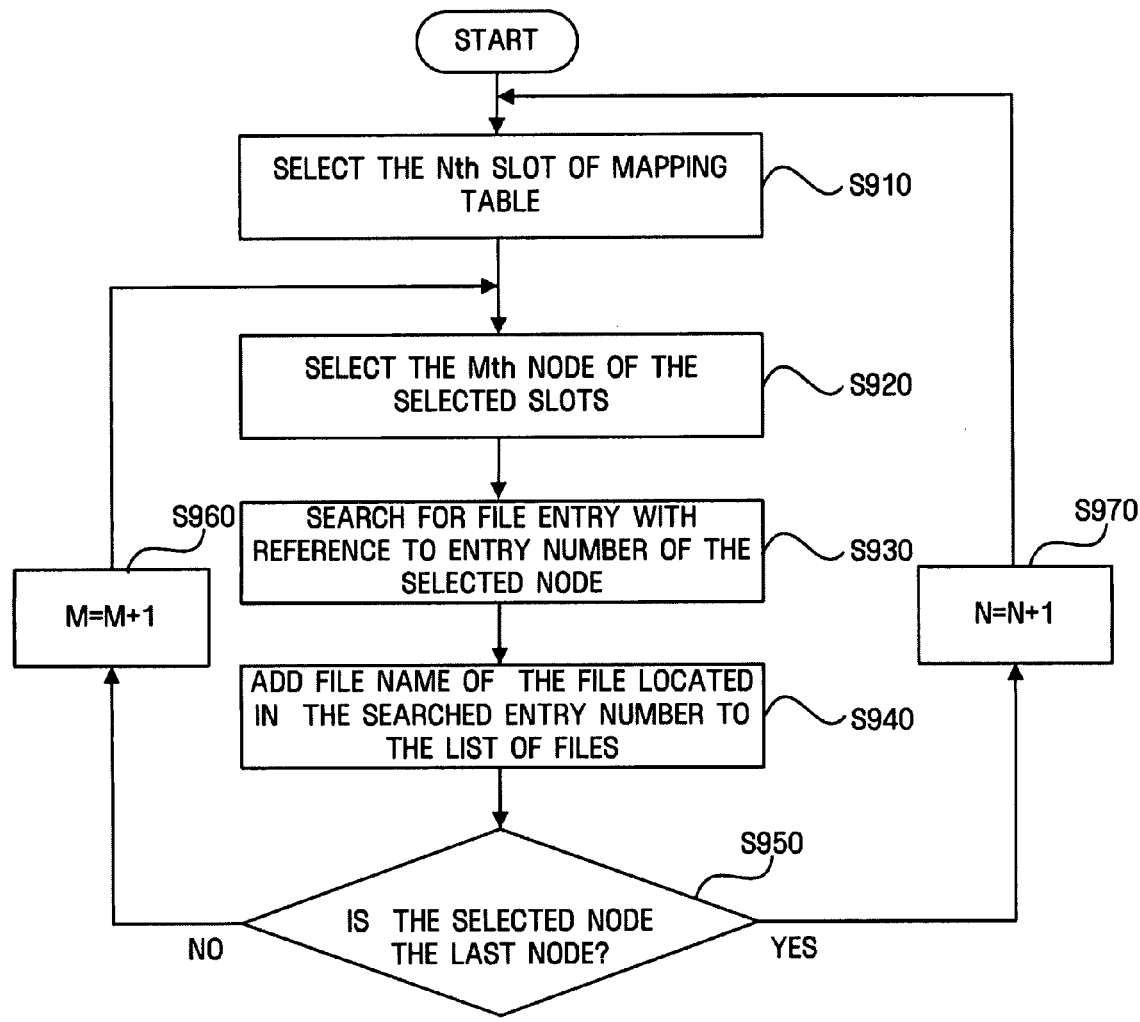
FIG. 9 is a flow chart specifically illustrating operation S550 of indicating a file list in a directory with reference to the mapping table in FIG. 5.

FIG. 9 is a flowchart specifically illustrating operation S550 of indicating a file list of the file in which an access has been performed in FIG. 5.

For explanatory convenience, the case where the above-mentioned access to the DIR1 file is re-performed will be used as an example.

First, the file-management apparatus 200 selects a slot in the mapping table 400 of the DIR1 file (for example, the first slot 410) (S910).

Next, the file-management apparatus 200 searches for the file entry 300 of the DIR1 file with reference to the file entry 300 number of the node located at the top among the nodes linked to the first slot 410 in operations S920 and S930.

Then, the file-management apparatus 200 adds the file name located at the searched-for entry number to the list of files (S940). At this time, the list of files should be displayed by the display device 20.

Next, the file-management apparatus 200 determines if the node selected in operation S920 is the last node linked to the corresponding slot (S950). That is, the file-management apparatus 200 determines if the first node 411 of the first slot 410 is the last node among the nodes linked to the first slot 410.

If the node selected in operation S920 is not the last node linked to the corresponding slot (NO in operation S950), the file-management apparatus 200 searches for the file entry 300 in operations (S960, S920, S930), with reference to the entry number of the node located next to the slot searched in operation S910. For example, the first node 431 and the second node 432 are linked to the third slot 430 in the mapping table 400 of FIG. 4C. If the node selected in operation S920 is the first node 431 of the third slot 430, the file-management apparatus 200 selects the second node 432 of the third slot 430.

If the node selected in operation S920 is the last node linked to the corresponding slot (YES in operation S950), the file-management apparatus 200 selects the slot located next to the slot searched in operation S910 (S970 and S910). For example, in the mapping table 400 of FIG. 4C, the first node 411 linked to the first slot 410 is the last node linked to the first slot 410. Therefore, the file-management apparatus 200 selects the slot located next to the first slot 410 (for example, the second slot 420). Then, it repeats the above-mentioned steps S910 through S970 so that the list of the files existing at the bottom part of the DIR1 file can be displayed through the display device 20.

Meanwhile, according to an exemplary embodiment of the present invention, each node of the second file in the mapping table may include the hash value of the file name of a file among a plurality of files included in the file entry and the entry number of the file. At this time, it is desirable for the first calculating unit to calculate the different hash value of the different input value.

Figure 10:
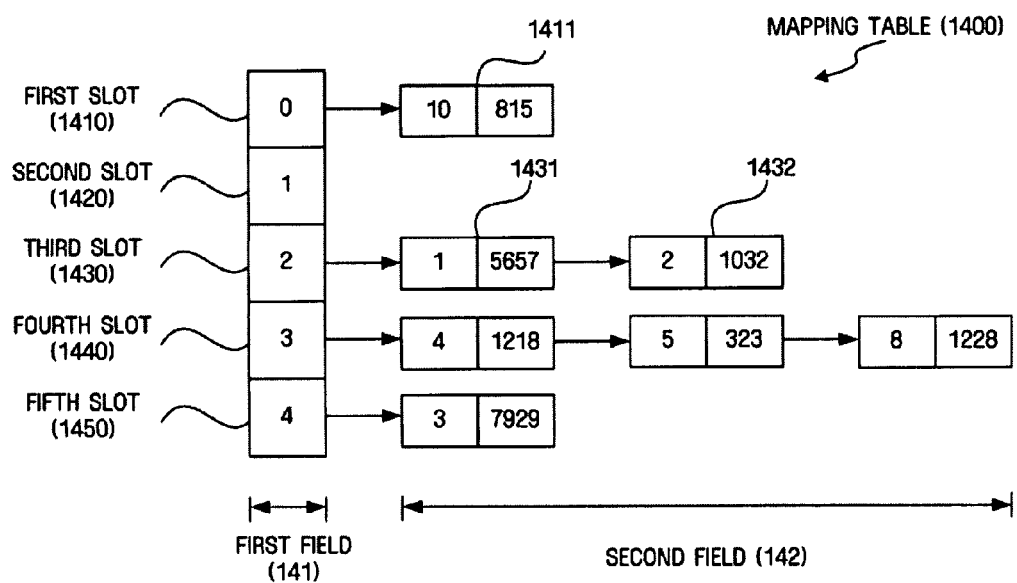
FIG. 10 illustrates the mapping table according to another exemplary embodiment of the present invention.

FIG. 10 illustrates the mapping table according to an exemplary embodiment of the present invention.

With reference to FIG. 10, a mapping table 1400 of the DIR1 file has the second field wherein each node includes the entry number and the hash value of file. That is, the first node 1431 of the third slot 1430 includes the hash value and the entry number with respect to the file name "AAA.TXT", and the second node 1432 of the third slot 1430 includes the hash value and the entry number with respect to the file name "BBB.TXT".

If the mapping table 1400 is as illustrated in FIG. 10, and a new file is generated in the DIR1 file, the file-management apparatus determines if the temporary file name is valid by directly comparing the hash value of the temporary file name of the file to be generated and the hash value of the mapping table 1400.

For example, when the file having file name "HHH.TXT" is generated in the DIR1 file, the first calculating unit calculates the hash value of the temporary file name "HHH.TXT". The hash value calculated by the first calculating unit is provided to the determining unit and the second calculating unit respectively.

When the hash value of the temporary file name "HHH.TXT" is calculated by the first calculating unit, the second calculating unit calculates the remainder obtained by dividing the hash value into 5, and provides it to the determining unit.

When the hash value and the result value with respect to the temporary file name "HHH.TXT" are respectively provided by the first calculating unit and the second calculating unit, the determining unit searches for the slot corresponding to the result value calculated by the second calculating unit in the mapping table 1400. For example, if the result value calculated by the second calculating unit is 2, the determining unit searches for the slot corresponding to the result value 2 (that is, the third slot 1430) in the mapping table 1400.

Then, the determining unit compares the hash values of the nodes linked to the third slot 1430 and the hash value calculated by the first calculating unit (that is, the hash value of the temporary file name "HHH.TXT").

If the hash value of the nodes linked to the third slot 1430 and the hash value of the temporary file name are not identical, the determining unit determines that the temporary file name is valid. In such a case, the file having the temporary file name ".TXT" as a formal file name can be generated at the bottom part of the DIR1 file. If the file having a file name ".TXT" is generated in the DIR1 file, the mapping table 1400 is renewed by the mapping-table-generating unit.

If a certain hash value among the hash values that the nodes linked to the third slot 1430 have and the hash value of the temporary file name "HHH.TXT" are identical, the determining unit DIR1 determines that the temporary file name "HHH.TXT" already exists in the DIR1 file. That is, the determining unit determines that the temporary file name "HHH.TXT" is not valid.

Meanwhile, when the mapping table 1400 is as illustrated in FIG. 10 and the existing file in the DIR1 file is deleted, the file-management apparatus manages the file to be deleted by directly comparing the hash value of the file name of the file to be deleted and the hash value of the mapping table 1400.

For example, when the file having file name "GGG.TXT" is to be deleted among the files located at the bottom part of the DIR1 file, the first calculating unit calculates the hash value of the file name "GGG.TXT" (for example, 815). The hash value calculated by the first calculating unit is provided to the determining unit and the second calculating unit respectively.

The second calculating unit calculates the remainder obtained by dividing the hash value of the file name "GGG.TXT" into 5, and then provides it to the determining unit.

Next, the determining unit searches for the slot corresponding to the result value calculated by the second calculating unit in the mapping table 1400. For example, when the result value calculated by the second calculating unit is 0, the determining unit searches for the slot corresponding to the result value 0 (that is, the first slot 1410) in the mapping table 1400.

Next, the determining unit compares the hash values of the nodes linked to the first slot 1410, and the hash value of the file to be deleted having file name GGG.TXT.

During the comparison, the determining unit searches for the file entry 300 with reference to the entry number of the node having the hash value identical to the hash value of the file name "GGG.TXT", among the nodes linked to the first slot 1410. That is, the determining unit searches for the file entry 300 with reference to the entry number of the first node 1411 of the first slot 1410. Then the file searched in the file entry 300 is deleted from the file entry 300. That is, the file having the file name "GGG.TXT" is deleted at the bottom part of the DIR1 file. The mapping-table-generating unit also deletes the node having the hash value identical to the hash value of the file name "GGG.TXT" in the mapping table 1400, and renews the mapping table 1400.

According to an aspect of the present invention, the time taken for file retrieval in a file system can be reduced and the file management performance can be improved.

The exemplary embodiments of the present invention have been described for illustrative purposes, and those skilled in the art will appreciate that various modifications, additions and substitutions are possible without departing from the scope and spirit of the invention as disclosed in the accompanying claims. Therefore, the scope of the present invention should be defined by the appended claims and their legal equivalents.

What is claimed is:

1. An apparatus for managing files by use of at least one hardware processor, the apparatus comprising:
    a first calculating unit that calculates a first hash value of a file name of a first file among a plurality of files included in a file entry;
    a second calculating unit that calculates a first result value based on the first hash value; and
    a mapping-table-generating unit that generates a mapping table including a plurality of slots and mapping an entry number of the first file to one of the slots corresponding to the first result, when the result value is used to search a slot; and
    a control unit that manages a plurality of files included in the file entry based on the mapping table,
    wherein the first calculating unit calculates a second hash value of a file name of a second file to be deleted in the file entry, and the second calculating unit calculates a second result value based on the second hash value,
    wherein if the second hash value and the second result value are respectively identical to the first hash value and the first result value the control unit deletes the first file.

2. The apparatus of claim 1, wherein the mapping table is generated in response to the first file being first accessed.

3. The apparatus of claim 1, wherein the mapping table comprises:
    a first field that comprises a plurality of slots corresponding to result values; and
    a second field that comprises a node having a file entry number matching the first result value, and that is linked to the slot corresponding to the first result value.

4. An apparatus for managing files by use of at least one hardware processor, the apparatus comprising:
    a first calculating unit that calculates a first hash value of a file name of a first file among a plurality of files included in a file entry;
    a second calculating unit that calculates a first result value based on the first hash value;
    a mapping-table-generating unit that generates a mapping table including a plurality of slots and mapping an entry number of the first file to one of the slots corresponding to the first result, when the result value is used to search a slot;
    a determining unit that searches for a slot matched to an accessed file name, and determines that the accessed file name is valid if not file name corresponding to the accessed file name is found in the matched slot; and
    a control unit that manages a plurality of files included in the file entry based on the mapping table,
    wherein the mapping table comprises: a first field that comprises a plurality of slots corresponding to result values; and a second field that comprises a node having a file entry number matching the first result value, and that is linked to the slot corresponding to the first result value, wherein the first calculating unit calculates a second hash value of a file name of a second file to be deleted in the file entry, and the second calculating unit calculates a second result value based on the second hash value, wherein if the second hash value and the second result value are respectively identical to the first hash value and the first result value the control unit deletes the first file.

5. The apparatus of claim 4, wherein the mapping-table-generating unit searches for the slot having the second result value in the mapping table and deletes the entry number corresponding to the file name of the first file in the searched slot if the first file is deleted by the control unit.

6. The apparatus of claim 4, wherein the node further comprises the first hash value.

7. The apparatus of claim 6, wherein the mapping-table-generating unit searches for the slot having the second result value in the mapping table and deletes the node having a hash value identical to the second hash value in the searched slot if the first file is deleted by the control unit.

8. The apparatus of claim 3, wherein the first calculating unit calculates a third hash value of a temporary file name of a third file to be stored in the file entry, and the second calculating unit calculates a third result value based on the third hash value.

9. The apparatus of claim 8, wherein the determining unit searches for the slot having the third result value and, if the file names corresponding to the entry numbers of the slot having the third result value and the temporary file names are not identical, the determining unit determines that the temporary file name is valid.

10. The apparatus of claim 8, wherein the node further comprises the first hash value.

11. The apparatus of claim 9, wherein the mapping table searches for the slot having the third result value in the mapping table and, if the first hash values and the third hash value are not identical, the determining unit determines that the temporary file name is valid.

12. A method of managing files, implemented by at least one hardware processor ~ the method comprising:

calculating a first hash value of a file name of a first file among a plurality of files included in a file entry;

calculating a first result value based on the first hash value;

generating a mapping table including a plurality of slots and mapping an entry number of the first file to one of the slots corresponding to the first result, when the result value is used to search a slot;

searching for a slot matched to an accessed file name, and determining that the accessed file name is valid if no file name corresponding to the accessed file name is found in the matched slot;

calculating a second hash value of a file name of a second file to be deleted in the file entry; and calculating a second result value based on the calculated second hash value, wherein if the second hash value and the second result value are respectively identical to the first hash value and the first result value, the first file is deleted.

13. The method of managing files of claim 12, wherein the mapping table is generated in response to the first file being first accessed.

14. The method of managing files of claim 12, wherein the mapping table comprises:

a first field that comprises a plurality of slots corresponding to result values; and a second field that comprises a node having a file entry number matching the first result value, and the node is linked to the slot corresponding to the first result value.

15. A method of managing files, implemented by at least one hardware processor, the method comprising:

calculating a first hash value of a file name of a first file among a plurality of files included in a file entry;

calculating a first result value based on the first hash value;

generating a mapping table including a plurality of slots and mapping an entry number of the first file to one of the slots corresponding to the first result, when the result value is used to search a slot;

searching for a slot matched to an accessed file name, and determining that the accessed file name is valid if no file name corresponding to the accessed file name is found in the matched slot;

calculating a second hash value of a file name of a second file to be deleted in the file end; and calculating a second result value based on the calculated second hash value, wherein the mapping table comprises: a first field that comprises a plurality of slots corresponding to result values; and a second field that comprises a node having a file entry number matching the first result value, and the node is linked to the slot corresponding to the first result value, wherein if the second hash value and the second result value are respectively identical to the first hash value and the first result value, the first file is deleted.

16. The method of managing files of claim 15, wherein the calculating of the second result value comprises:

searching for the slot having the second result value in the mapping table and deleting the entry number corresponding to the file name of the second file in the searched slot.

17. The method of managing files of claim 15, wherein the node further comprises the first hash value.

18. The method of managing files of claim 17, wherein the calculating of the second result value comprises:

searching the mapping table for the slot having the second result value if the first file is deleted; and deleting the node having the hash value identical to the second hash value in the searched slot.

19. The method of managing files of claim 14, further comprising:

calculating a third hash value of a temporary file name of a third file to be stored in the file entry, and calculating a third result value based on the third hash value.

20. The method of managing files of claim 19, further comprising:

searching for the slot having the third result value in the mapping table; and if the file names corresponding to the entry numbers of the searched slot and the temporary file name are not identical, determining that the temporary file name is valid.

21. The method of managing files of claim 19, wherein the node further comprises the first hash value.

22. The method of managing files of claim 20, further comprising searching for the slot having the third result value in the mapping table; and if the first hash values that the nodes of the searched slot have and the third hash value are not identical, determining that the temporary file name is valid.

* * * * *